(12) United States Patent
Park et al.

(10) Patent No.: US 12,328,598 B2
(45) Date of Patent: Jun. 10, 2025

(54) METHOD AND SYSTEM FOR ESTIMATING INDOOR RADIO TRANSMITTER COUNT

(71) Applicant: Telefonaktiebolaget LM Ericsson (publ), Stockholm (SE)

(72) Inventors: Taesuh Park, Santa Clara, CA (US); Jianfu Zhang, Santa Clara, CA (US); Joji Philip, Milpitas, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 344 days.

(21) Appl. No.: 17/797,412

(22) PCT Filed: Feb. 12, 2021

(86) PCT No.: PCT/IB2021/051218
§ 371 (c)(1),
(2) Date: Aug. 3, 2022

(87) PCT Pub. No.: WO2021/161273
PCT Pub. Date: Aug. 19, 2021

(65) Prior Publication Data
US 2023/0041036 A1    Feb. 9, 2023

Related U.S. Application Data

(60) Provisional application No. 62/976,221, filed on Feb. 13, 2020.

(51) Int. Cl.
*H04W 16/20* (2009.01)
*H04B 17/27* (2015.01)
*H04W 64/00* (2009.01)

(52) U.S. Cl.
CPC .......... *H04W 16/20* (2013.01); *H04B 17/27* (2015.01); *H04W 64/003* (2013.01)

(58) Field of Classification Search
CPC ..... H04W 16/20; H04W 16/00; H04W 16/18; H04W 64/00; H04W 64/04;
(Continued)

(56) References Cited

U.S. PATENT DOCUMENTS 7,035,643 B2 * 4/2006 Slawitschka et al. ........ 455/446
9,131,403 B1    9/2015 Courchesne et al.
(Continued)

FOREIGN PATENT DOCUMENTS

CN    110866888 A    3/2020
EP    3213432 A1    9/2017
(Continued)

OTHER PUBLICATIONS (JP 2014072633 A) >>> Indoor Base Station For Wireless Communications System Has Adjacency Relationship Judgment Unit That Determines Adjacency Relationship Of Indoor Base Station And Outdoor Base Station From Determination Number (see title) (Year: 2014).*

(Continued)

*Primary Examiner* — Jean A Gelin
(74) *Attorney, Agent, or Firm* — NICHOLSON DE VOS WEBSTER & ELLIOTT LLP

(57) ABSTRACT

Methods, systems, and storage media are disclosed to estimate a count of indoor radio transmitters for a building, where the indoor radio transmitters are to be planned to build an indoor cellular network within the building. In one embodiment, a method comprises obtaining (310) locational information of the building in a database based on a query; extracting (312) features external to the building based on the locational information of the building, wherein the features external to the building capture characteristics about the building that are observable from outside of the building; and estimating (314) the count of the indoor radio transmit- (Continued)

ters for the building using the extracted features and a pre-trained model.

20 Claims, 15 Drawing Sheets

(58) Field of Classification Search
CPC . H04W 64/003; H04W 16/225; H04W 16/22; H04W 16/02; H04B 17/27; H04B 17/391; H04B 10/11; H04B 10/1129; H04B 10/1149; G01S 5/011; G01S 5/012; G01S 5/013; G01S 5/014; G01S 5/015; G01S 5/016; G01S 19/073; G01S 19/12; G01S 2205/00; G01S 2205/001; G01S 2205/007; G01S 2205/008; G01S 2201/02; G01S 2201/025
USPC ........................................................ 455/456.1
See application file for complete search history.

(56) References Cited

U.S. PATENT DOCUMENTS

| | | | |
|---|---|---|---|
| 10,606,963 | B2 | 3/2020 | Tiwari et al. |
| 2007/0047492 | A1* | 3/2007 | Kim ................ H04W 36/00835 455/436 |
| 2009/0061939 | A1* | 3/2009 | Andersson et al. |
| 2011/0306363 | A1* | 12/2011 | Wang .................... H04W 24/02 370/241.1 |
| 2013/0194276 | A1 | 8/2013 | Sato et al. |
| 2015/0094014 | A1* | 4/2015 | Diamond et al. ........ H04W 4/22 |
| 2015/0356099 | A1* | 12/2015 | Targonski et al. .. G06F 17/3087 |
| 2016/0066179 | A1* | 3/2016 | Huang ................ G06F 21/6254 726/26 |
| 2017/0272131 | A1* | 9/2017 | Ananth ................ H04B 7/0413 |
| 2017/0338901 | A1 | 11/2017 | Zhihua et al. |
| 2018/0120410 | A1 | 5/2018 | Ivanov et al. |
| 2019/0304104 | A1 | 10/2019 | Amer et al. |

FOREIGN PATENT DOCUMENTS

| | | | | |
|---|---|---|---|---|
| EP | 3291590 | A1 | 3/2018 | |
| WO | 98/31112 | A2 | 7/1998 | |
| WO | WO 0079735 | A1 * | 12/2000 | ............ H04L 12/42 |
| WO | WO 0158194 | A1 * | 8/2001 | ............ H04Q 7/36 |
| WO | 2016/067017 | A1 | 5/2016 | |
| WO | 2017/039521 | A1 | 3/2017 | |
| WO | WO 2019063079 | A * | 4/2019 | ............ G05B 15/02 |
| WO | 2019/120487 | A1 | 6/2019 | |
| WO | 2019/220243 | A1 | 11/2019 | |
| WO | 2019/220244 | A1 | 11/2019 | |
| WO | 2021/161273 | A1 | 8/2021 | |
| WO | 2021/176262 | A1 | 9/2021 | |
| WO | 2023/170457 | A1 | 9/2023 | |

OTHER PUBLICATIONS (JP H11191752 A) >>> Radio Base Station and Radio Communication Area Forming Method (see title) (Year: 1999).*
(CN 107646118 A) >>> For Determining RF Sensor Performance Associated With The Floor Plan Of The System And Method (see title) (Year: 2018).*
(WO 2018107906 A1) >>> Classification Model Training Method, and Data Classification Method and Device (see title) (Year: 2018).*
(JP 2010187140 A) >>> Communication Characteristics Analysis System, Communication Characteristics Analysis Method, and Communicating Characteristics Analysis Program (see title) (Year: 2010).*
Murali et al., "Indoor Scan2BIM: Building Information Models of House Interiors", 2017 IEEE/RSJ International Conference on Intelligent Robots and Systems (IROS), Available Online at <https://www.microsoft.com/en-us/research/uploads/prod/2019/09/MSrivathsan2017IROS.pdf>, Sep. 2017, 8 pages.
Acedo-Hernández, et al., "Automatic Clustering Algorithms for Indoor Site Selection in LTE", EURASIP Journal on Wireless Communications and Networking, vol. 2016, Article No. 87, 2016, pp. 1-13.
Isola, et al., "Image-to-Image Translation with Conditional Adversarial Networks", 2017 IEEE Conference on Computer Vision and Pattern Recognition (CVPR), 2017, pp. 11125-1134.
Liu, et al., "DA-cGAN: A Framework for Indoor Radio Design Using a Dimension-Aware Conditional Generative Adversarial Network", 2020 IEEE/CVF Conference on Computer Vision and Pattern Recognition Workshops (CVPRW), 2020, pp. 2089-2098.
PCT Patent Application titled "Estimating Obstacle Materials From Floor Plans", Application No. PCT/IB2022/054451, filed on May 13, 2022 by Telefonaktiebolaget LM Ericsson, 29 pages.
Ronneberger, et al., "U-Net: Convolutional Networks for Biomedical Image Segmentation", MICCAI 2015, Part III, LNCS 9351, 2015, pp. 234-241.
U.S. Provisional Patent Application titled "Estimating Obstacle Materials From Floor Plans", U.S. Appl. No. 63/319,246, filed Mar. 11, 2022 by Park et al., 28 pages.
U.S. Provisional Patent Application titled "Method and System for Determining Indoor Radio Transmitter Distribution", U.S. Appl. No. 62/985,807, filed Mar. 5, 2020 by Park et al., 66 pages.

* cited by examiner d) Building coverage ratio (BCR)
208 g) Gap
(average minimum distance to surrounding buildings)
214 c) Rental index (e.g., last three years, min-max normalized)
206 f) Population Density
212 b) Nearby building count
204 a) Area size
202 e) Openness
(blocked angle by surrounding buildings)
210

METHOD AND SYSTEM FOR ESTIMATING INDOOR RADIO TRANSMITTER COUNT

CROSS-REFERENCE TO RELATED APPLICATIONS

This application is a National stage of International Application No. PCT/IB2021/051218, filed Feb. 12, 2021, which claims the benefit of U.S. Provisional Application No. 62/976,221, filed Feb. 13, 2020, which is are hereby incorporated by reference.

TECHNICAL FIELD

Embodiments of the invention relate to the field of communication network design; and more specifically, to estimating an indoor radio transmitter count.

BACKGROUND ART

Telecommunication companies are expanding the coverage of their cellular networks to indoor environments. It is desirable to build indoor cellular networks with reasonable investment of time and resources. Yet the current network design often includes multiple iterations and requires a network designer to absorb the substantial costs of providing a free estimate determined through a process that is labor intensive and involves multiple parties. Thus, it is preferrable to simplify the estimation process for building the indoor cellular networks.

SUMMARY OF THE INVENTION

Embodiments of the application disclose methods to estimate an indoor radio transmitter count for a building, where the indoor radio transmitters are to be planned to build an indoor cellular network within the building. In one embodiment, a method comprises obtaining locational information of the building in a database based on a query; extracting features external to the building based on the locational information of the building, where the features external to the building capture characteristics about the building that are observable from outside of the building; and estimating the count of the indoor radio transmitters for the building using the extracted features and a pre-trained model.

Embodiments of the application disclose electronic devices to estimate an indoor radio transmitter count for a building, where the indoor radio transmitters are to be planned to build an indoor cellular network within the building. In one embodiment, an electronic device comprises a processor and non-transitory machine-readable storage medium storing instructions, which when executed by the processor, are capable of causing the electronic device to perform a method. The method comprises obtaining locational information of the building in a database based on a query; extracting features external to the building based on the locational information of the building, where the features external to the building capture characteristics about the building that are observable from outside of the building; and estimating the count of the indoor radio transmitters for the building using the extracted features and a pre-trained model.

Embodiments of the application disclose storage media to estimate an indoor radio transmitter count for a building, where the indoor radio transmitters are to be planned to build an indoor cellular network within the building. In one embodiment, a non-transitory machine-readable storage medium that stores instructions, which when executed by a processor, are capable of causing an electronic device to perform a method. The method comprises obtaining locational information of the building in a database based on a query; extracting features external to the building based on the locational information of the building, where the features external to the building capture characteristics about the building that are observable from outside of the building; and estimating the count of the indoor radio transmitters for the building using the extracted features and a pre-trained model.

Through embodiments of the application, a network designer may estimate an indoor radio transmitter count for a building without the floorplan of the building. The estimation reduces the risk of a large sum of upfront costs in building an indoor cellular network. The machine learning based estimation is scalable and efficient, and it has achieved significant savings in building indoor cellular networks.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
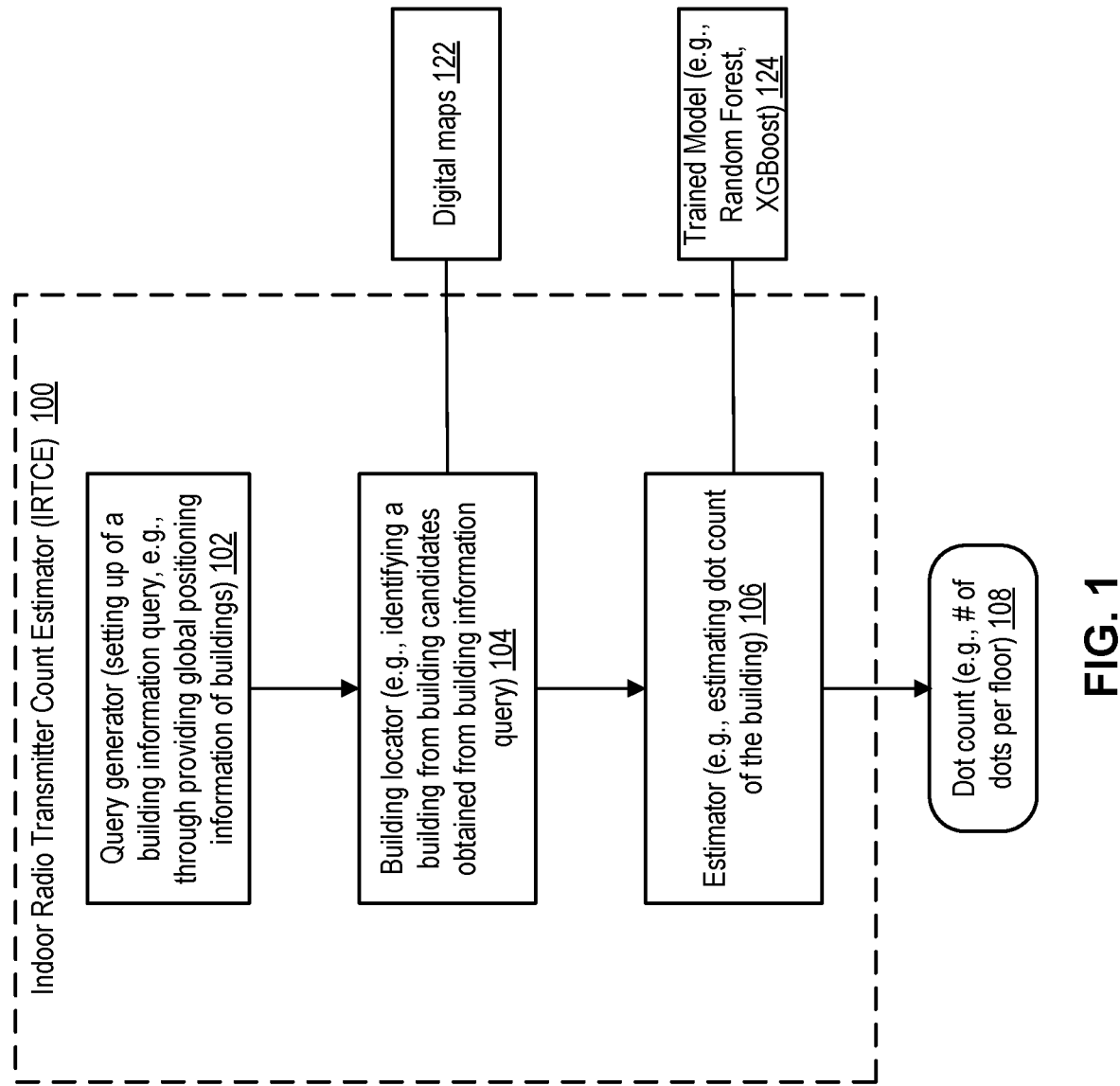
FIG. 1 is a block diagram showing various modules for estimating an indoor radio transmitter count per some embodiments.

The following description describes methods, systems, and storage media for estimating an indoor radio transmitter count. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments. However, such notations should not be taken to mean that these are the only options or optional operations, and/or that blocks with solid borders are not optional in certain embodiments.

In the description, embodiments, and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein, refers to any positive whole number of items including one item.

Estimating Indoor Radio Transmitter Count Based on Landlord Provided Information When a telecommunication company expands the coverage of their cellular networks to an indoor environment, a network designer may take the following steps:
  select a building arbitrarily from a pool of buildings that have not installed radio transmitters yet;
  collect floorplans of the building by requesting to its landlord if he or she agrees on the pilot evaluation;
  simulate the draft radio design for the building using the collected floorplans and a dedicated simulation tool;
  generate a preliminary quote, which includes an estimated number of indoor radio units (IRUs) (also referred to as dots) or the Bill of Materials (BOM), based on the simulation result;
  contact the landlord with the preliminary quote and make an initial contract if the landlord accepts the quote;
  let engineers visit the building and collect more data by measuring the radio signal strength across the floors of the building;
  elaborate the radio design based on the collected data using the simulation tool and adjust the quote accordingly;
  make a final contract if the landlord approves the adjusted quote; and
  send the installation engineers with the estimated number of radio transmitters and related materials to the building and let them install onsite.

These steps introduce uncertainties and cause many issues in implementation. For example, all the time and money for the initial steps from selecting a building through generating the preliminary quote become sunk costs if the landlord does not accept the preliminary quote for any reason (e.g., the quote is beyond the budget of the landlord). Additionally, the landlord can be a hard-to-control factor of delaying or even terminating the process by not providing a proper floorplan due to (1) a strict security policy (e.g., banks, federal government office, etc.) or (2) insufficient digitization (e.g., paper blueprints in the cabinet) and/or by delaying the delivery of the floorplans due to holidays or specific schedules. It makes selecting a feasible building difficult. Furthermore, even though the initial steps are not guaranteed to generate revenue, the dedicated simulation tool is still required thereby increasing costs by its expensive user license and required computing resources. Thus, expanding the in-building implementation for the telecommunication companies is severely limited in its scale and business opportunities.

Machine-Learning-Based Solutions

Embodiments of the disclosure propose machine-learning-based solutions of estimating the rough number of indoor radio transmitters without floorplans by proposing a system and method of utilizing the exterior information, which is observable outside of the building from aerial views and/or digital maps, to meet the less strict requirement for the preliminary quote than that of the adjusted quote for the final contract. The exterior information is also referred to as locational information, from which features external to the building may be extracted, and the features external to the building capture characteristics about the building that are observable, discernable, or otherwise obtainable from outside of the building.

By using historical data of buildings about their respective number of indoor radio transmitters as a training dataset, a machine learning model can be trained to estimate the rough number of required indoor radio transmitters from features that are observable from outside of the building and correlated with indoor layout and density such as area footprint, building coverage ratio, or population density, to name a few.

By using observable-from-outside factors of a building that affect floor density, embodiments of the disclosure enable a rough estimation of the number of dot transmitters without time-consuming information acquisition and simulation. For example, features external to the building such as area size, building coverage ratio (BCR), population density, nearby rental price, and number of nearby buildings, which may be extracted from exterior information, make the estimation achievable.

In its inference stage, extracting the same features from a target building and feeding to the pre-trained model as an input vector will produce the estimated number of indoor radio transmitters required for the target building. Note that an input vector contains multiple data elements, each corresponding to a feature.

The embodiments of the disclosure make the first step with landlords unnecessary by removing the step of collecting floorplans and thereby eliminating the risk of the sunk costs, the biggest hurdle on the way toward business scaleup. The embodiments of the disclosure will allow the indoor radio design business to be scalable to any building that a designer may obtain its relevant exterior metadata from databases such as publicly available digital maps.

Also, the embodiments of the disclosure enable saving the lead time by skipping several steps for the preliminary quote and saving the license fees associated with using simulation tools for coping with more buildings. As an enabler of the process innovation, the embodiments of the disclosure may provide a financial impact of more than 7.5 million USD every year in North America alone.

Modules for Estimating Indoor Radio Transmitter Count

FIG. 1 is a block diagram showing various modules for estimating an indoor radio transmitter count per some embodiments. A query generator sets up a building information query as shown at reference 102. To generate the query, the query generator may be provided with information about the global position of a building in the format of geocoordinates (latitude/longitude), postal address, or property name that is searchable in digital maps 122 such as Open Street Map (OSM), Google Maps, or Microsoft Bing Maps.

Building locator 104 is a module that selects valid candidate buildings located at the global position that the building information query at reference 102 indicates. Due to the incompleteness of each GIS (Geographic Information System) such as positional offset or missing object in the digital maps 122, any query to the digital maps 122 does not always return a single building: this is the ideal case. In some embodiments, there are several steps to resolve the issue of zero/multiple buildings for the query to find the single building (target building): See FIG. 3 for details. Once the target building is selected, the features of the target building are then extracted at the building locator 104.

Estimator 106 is responsible for estimating an indoor radio transmitter count (e.g., the number of dots per floor as shown at reference 108, which is equal to the number of radio transmitters) for the target building based on extracted features of the target building. The estimator 106 uses a trained model 124 that is pretrained from pairs of buildings' feature vector and number of indoor radio transmitters from installation history of telecommunication companies. In some embodiments, Random Forest Regressor, Adaptive boosting (also referred to as Adaboost), and/or eXtreme Gradient Boost (also referred to as XGBoost) are used as a machine learning model. Each dot represents an indoor radio transmitter to be implemented on the floor.

The building information query 102, building locator 104, and estimator 106 may be modules within an indoor radio transmitter count estimator (IRTDE) 100. The IRTDE 100 may be implemented in an electronic device such as 602 discussed herein below.

Figure 2:
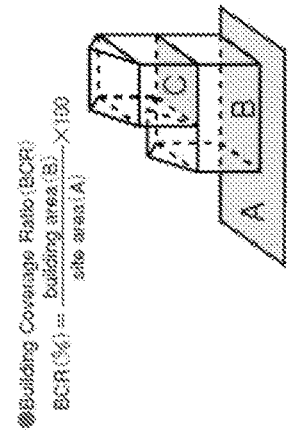
FIG. 2 shows the composition of feature vectors per some embodiments.
Figure 2:
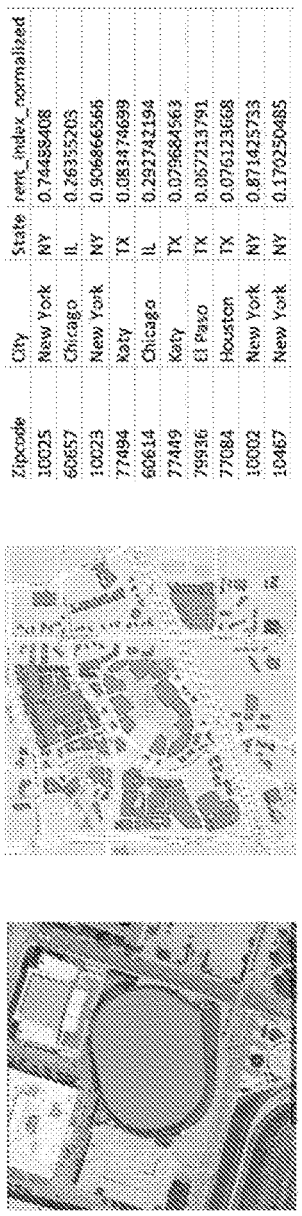
Figure 2:
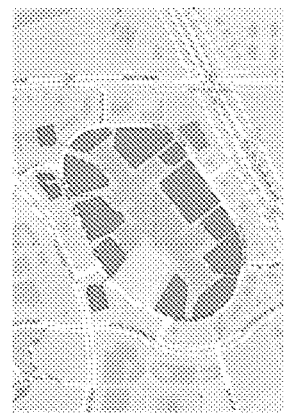
Figure 2:
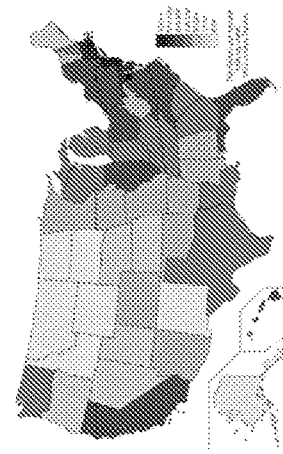
Figure 2:
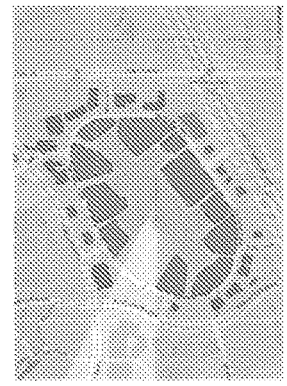

FIG. 2 shows the composition of feature vectors per some embodiments. A number of features external to a building may be a part of a feature vector fed to the trained model 124, including (some examples are shown in the figure):

Area size (e.g., in square feet or square meters) at reference 202: It may be calculated after obtaining a building's polygon from an application such as OpenStreetMap/Google Map.

Nearby building count at reference 204: It equals the number of buildings' polygons within an area (e.g., 2 km×2 km) centered at the building. The nearby buildings' polygons may also come from an application such as OpenStreetMap.

Rental index (e.g., average rental price nearby) at reference 206: This feature may be obtained from third party applications from vendors such as Zillow, Redfin, Trulia, Homesnap, NeighborhoodScout, Realtor.com, LoopNet, CoreLogic Matrix, Zoopla. Using rental index, one may obtain rental values normalized by zip code or other criteria over a timespan.

Building coverage ratio (BCR) at reference 208: The BCR may be calculated as a ratio of the building area to the site area, as shown in FIG. 2.

Openness at reference 210: This is the blocked angle by surrounding buildings. The blocked angles may be calculated using a list of footprint polygons of surrounding buildings. Note that the nearby buildings' polygons may also come from OpenStreetMap.

Population density of an area in which the building is located at reference 212: This is the population density of the area (e.g., within a zip code). It may be obtained through dividing the total population of a zip code by the area size of that zip code. Both the population and area size may be obtained from a local government, e.g., from websites such as https://www.census.gov/.

Gap at reference 214: The gap may be calculated as the average minimum distance to surrounding buildings that directly block the target building. The gap may be calculated using a list of footprint polygons of surrounding buildings. Again, the nearby buildings' polygons may also come from OpenStreetMap.

The building coverage ratio (BCR) may be obtained through the following operations: 1) extract a building footprint from digital maps (e.g., Google Maps); 2) calculate the area size of the building footprint; 3) find a rectangle which fits to the footprint (the rectangle represents the site/land area that covers the footprint, shown as area A, covering areas B and C); 4) calculate the rectangular size of the rectangle; and 5) calculate the BCR by dividing the area size by the rectangular size. The area A is a lot area for the building, and it is often shown as the rectangle in a digital map. The building coverage ratio may also be referred to as lot coverage.

Note that these features external to the building may be categorized in different types. For example, the nearby building count at reference 204, rental index at reference 206, and the population density at reference 212 may be referred to as building supply-demand relationship information; the BCR at reference 208 may be referred to as floor density information; the opening at reference 210 and gap at reference 214 may be referred to as cell interference information as they indicate the degree that signals from one or more cells (e.g., macrocells or microcells) are interfered by the physical environment.

Figure 3:
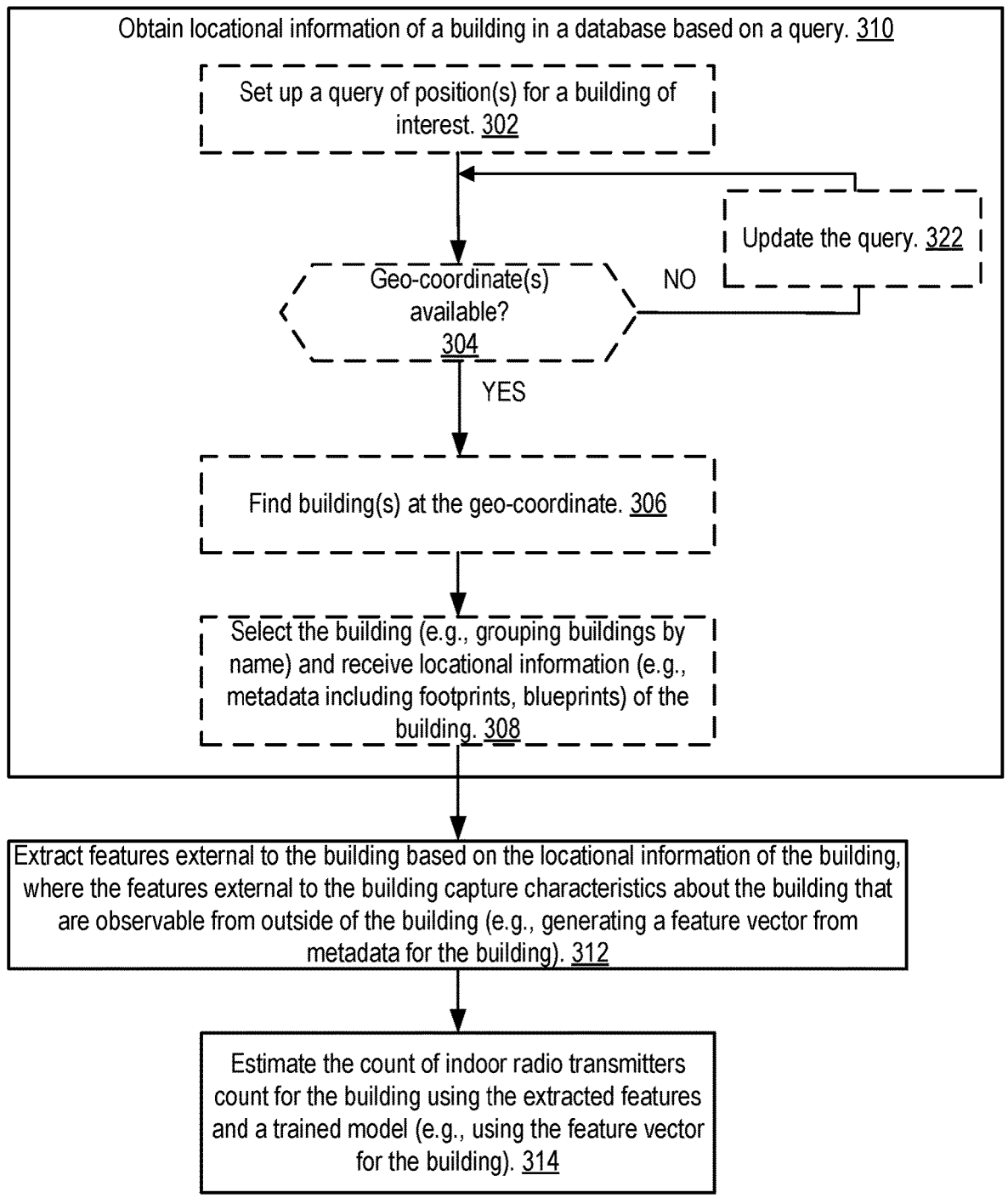
FIG. 3 is a flow chart to estimate the indoor radio transmitter count per some embodiments.

FIG. 3 is a flow chart to estimate the indoor radio transmitter count per some embodiments. The operations may be performed by an electronic device such as 602 discussed herein below. At reference 310, the locational information of a building is obtained in a database based on a query. The locational information of the building may be obtained through multiple sub-steps. For example, it may include setting up a query of position(s) for a building of interest at reference 302. The query may include multiple positions, and the query may be run multiple times or one time only for multiple buildings of interest. For expediency of explanation, a single query for a single building is described, but embodiments of the disclosure cover multiple queries for one or more buildings.

In some embodiments, the query indicates a geo-coordinate including the latitude and longitude of the building. In some embodiments, the query indicates a property name and/or a street address, which may be converted to the geo-coordinate in a digital map.

At reference 304, it is determined whether the geo-coordinate(s) of the building of interest (also referred to as a target building) can be found in a digital map discussed herein above. If it can be found, the flow goes to reference 306, and the building is identified, and the locational information related to the building is obtained at reference 308. If it cannot be found, the flow goes to reference 322, where the query is updated. The query may be updated to check a different digital map, or to change to a different geo-coordinate(s) of the building of interest, and the flow goes back to reference 304.

At reference 312, features are extracted from the locational information of the building. Each feature may be extracted from a type of the locational information. A portion or all of the extracted features may form a feature vector.

The locational information includes metadata such as footprints and/or blueprints of the building in some embodiments. For example, the locational information may include a footprint polygon of the building in a digital map. The features external to the building may include an area size of a footprint polygon of the building in a digital map.

In some embodiments, the features external to the building include metadata showing the supply-demand relationship in the area in which the building is located. In some embodiments, the metadata showing the supply-demand relationship includes the number of neighbor buildings that is calculated from a list of footprint polygons of neighbor buildings within a pre-determined range from the building. In some embodiments, the metadata showing the supply-demand relationship includes a population density of a town or neighborhood where the building is located. In some embodiments, the metadata showing the supply-demand relationship includes the average or median of rental prices of nearby buildings of the building. In some embodiments, the metadata showing the supply-demand relationship includes a list of rental prices of nearby buildings within a predetermined range from the building.

In some embodiments, the features external to the building include information about floor density of the building. In some embodiments, the information about floor density of the building includes a building coverage ratio of the building. In some embodiments, the building coverage ratio of the building is calculated by dividing the area size of the building footprint by the net property area within which the building is included.

In some embodiments, the features external to the building include a list of footprint polygons of neighbor buildings within a pre-determined range from the building. In some embodiments, the list of footprint polygons is further used to calculate gaps between the building and its neighbor buildings. In some embodiments, the list of footprint polygons is further used to calculate angles of blockage to the target building by surrounding buildings.

At reference 314, an indoor radio transmitter count is estimated using the extracted features and a pre-trained model. The pre-trained model is explained herein above relating to FIG. 1. The indoor radio transmitter count includes a number of radio transmitters to be implemented per floor for the building in some embodiments.

Once the indoor radio transmitter count is estimated, the network designer may use it to provide a quote to the client, who may present it to the landlord and/or decide whether to proceed. The estimation may be adjusted based on the client's input as well. Once an agreement is reached among the client, the network designer, and/or the landlord, the network designer may visit the building and collect more data by measuring the radio signal strength across the floors of the building, and the network designer may elaborate the radio design based on the collected data using the simulation tool and adjust the quote accordingly. Once the design is finalized and approved, the installation engineers may bring the estimated number of radio transmitters and related materials to the building and install the indoor radio transmitters onsite. The indoor radio network is thus built with efficiency and less upfront cost compared to traditional approaches.

Figure 4:
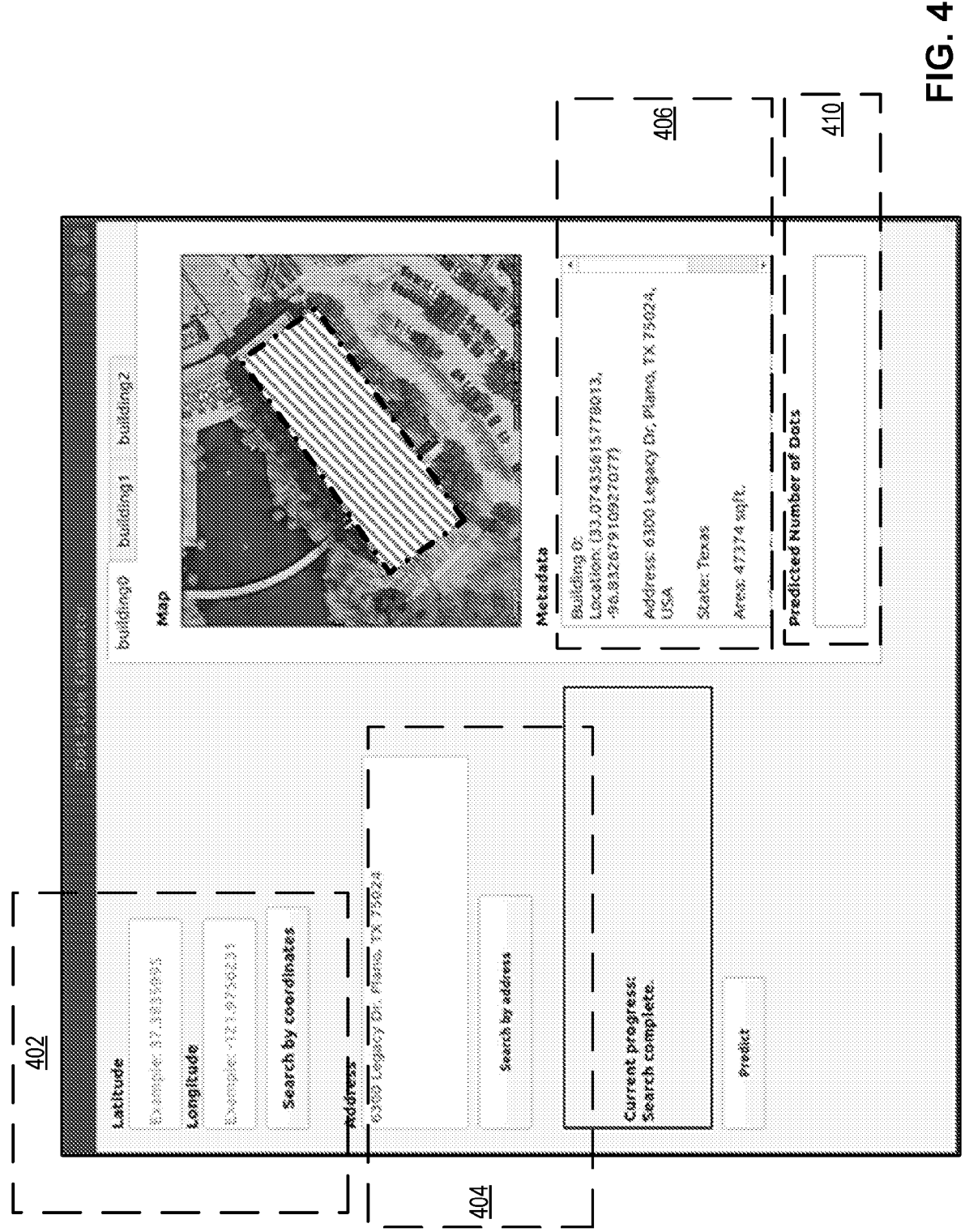
FIG. 4 is a snapshot of an exemplary query interface per some embodiments.

FIG. 4 is a snapshot of an exemplary query interface per some embodiments. Two ways of submitting a query are shown: by geocoordinates (the top left fields and "Search by coordinate" button) as shown at reference 402, and by postal address or property name (the middle left textbox and "Search by address" button) as shown at reference 404. The right image shows the augmented image of an aerial view and identified footprint (the dash-dot polygon) of one of the three target buildings found in the address. The "metadata" window at reference 406 shows the locational information such as metadata collected from one or more digital maps. Pressing the "Predict" button will return an estimated dot number (e.g., the number of indoor radio transmitters) per floor at reference 410.

Figure 5:
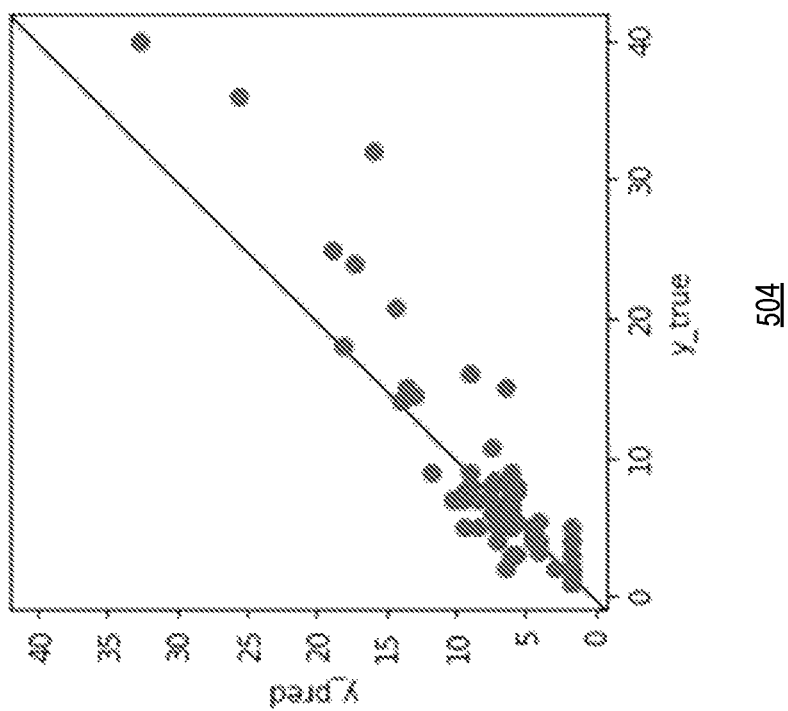
FIG. 5 is an evaluation result of the pre-trained model of predicting the rough number of radio transmitters per floor from the historical building data in one embodiment.
Figure 5:
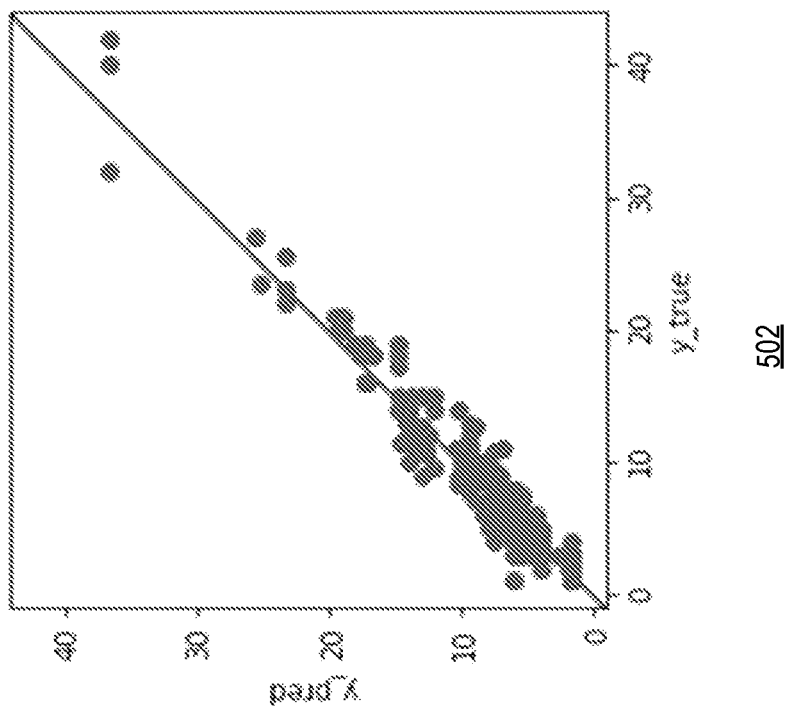

FIG. 5 is an evaluation result of the pre-trained model of predicting the rough number of radio transmitters per floor from the historical building data in one embodiment. The left plot at reference 502 is the result from the training set and the right plot at reference 504 is from the test set. Using a machine learning model such as Random Forest Regressor model, Adaboost model, and/or XGBoost model discussed herein, the parameters of the machine learning model are trained using the historical building data. Once the training reaches an acceptable or desired prediction accuracy (i.e., the model-estimated dot number points closely tracking the line indicating actual dot numbers required in the historical building data) as shown at reference 502, the training is complete. The pre-trained model is then used to predict the test set, and the result of the prediction is shown at reference 504.

FIG. 5 shows that the implementation achieves good test performance for small buildings requiring less than 10 radio transmitters while acceptable for the mid-size (10-20 transmitters) and underestimating for the big size (more than 20). It indicates that the selected locational information has significant correlation with the required number of radio transmitters inside the building. In some embodiments, underestimation for medium and large buildings may be compensated in the model, for example, by modifying weights on parameters correlated with building size.

Electronic Devices Implementing Some Embodiments

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical, or other forms of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, or a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radiofrequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to an NIC. One or more parts of an embodiment may be implemented using different combinations of software, firmware, and/or hardware.

Figure 6:
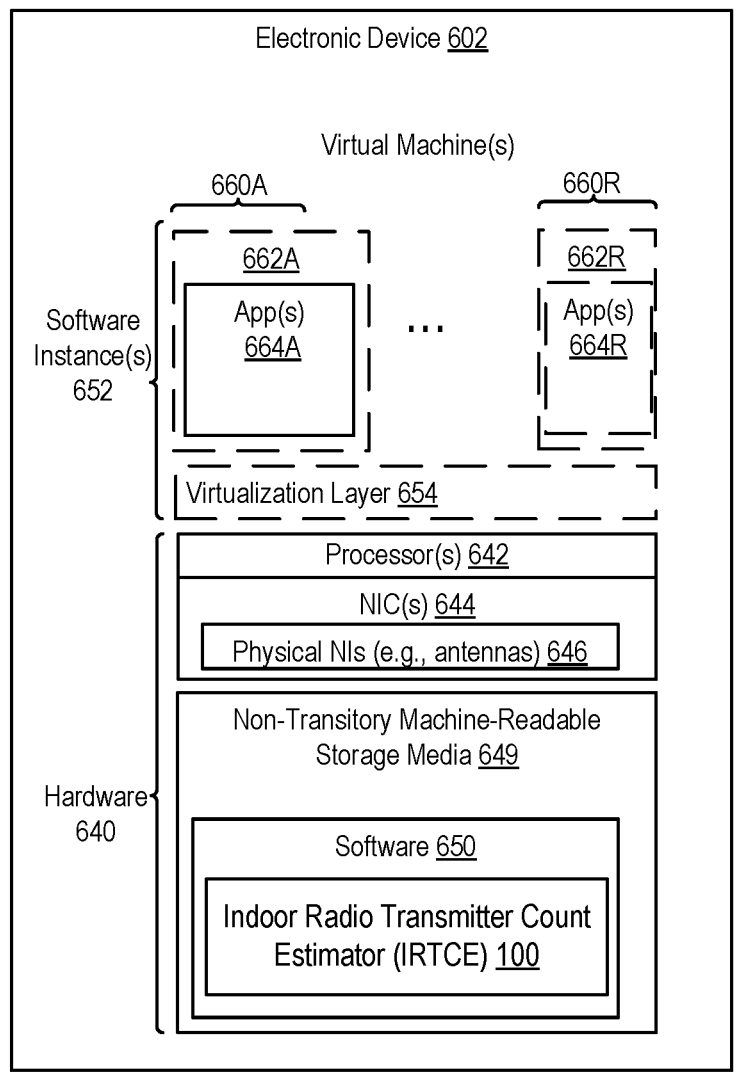
FIG. 6 illustrates an electronic device per one embodiment of the invention.

FIG. 6 illustrates an electronic device per one embodiment of the invention. The electronic device 602 may be implemented using custom application—specific integrated—circuits (ASICs) as processors and a special-purpose operating system (OS), or common off-the-shelf (COTS) processors and a standard OS. The electronic device 602 may be implemented in wireless networks discussed herein below as a network node or a separate control node (e.g., host computer 1110).

The electronic device 602 includes hardware 640 comprising a set of one or more processors 642 (which are typically COTS processors or processor cores or ASICs) and physical NIs 646, as well as non-transitory machine-readable storage media 649 having stored therein software 650. During operation, the one or more processors 642 may execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R run on top of a guest operating system within an instance 662A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers).

The software 650 contains the indoor radio transmitter count estimator (IRTDE) 100. The IRTDE 100 may perform operations in the one or more of exemplary methods described with reference to earlier figures. The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual electronic device 660A-R.

A network interface (NI) may be physical or virtual. In the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). The physical network interface 646 may include one or more antenna of the electronic device 602. An antenna port may or may not correspond to a physical antenna.

Figure 7:
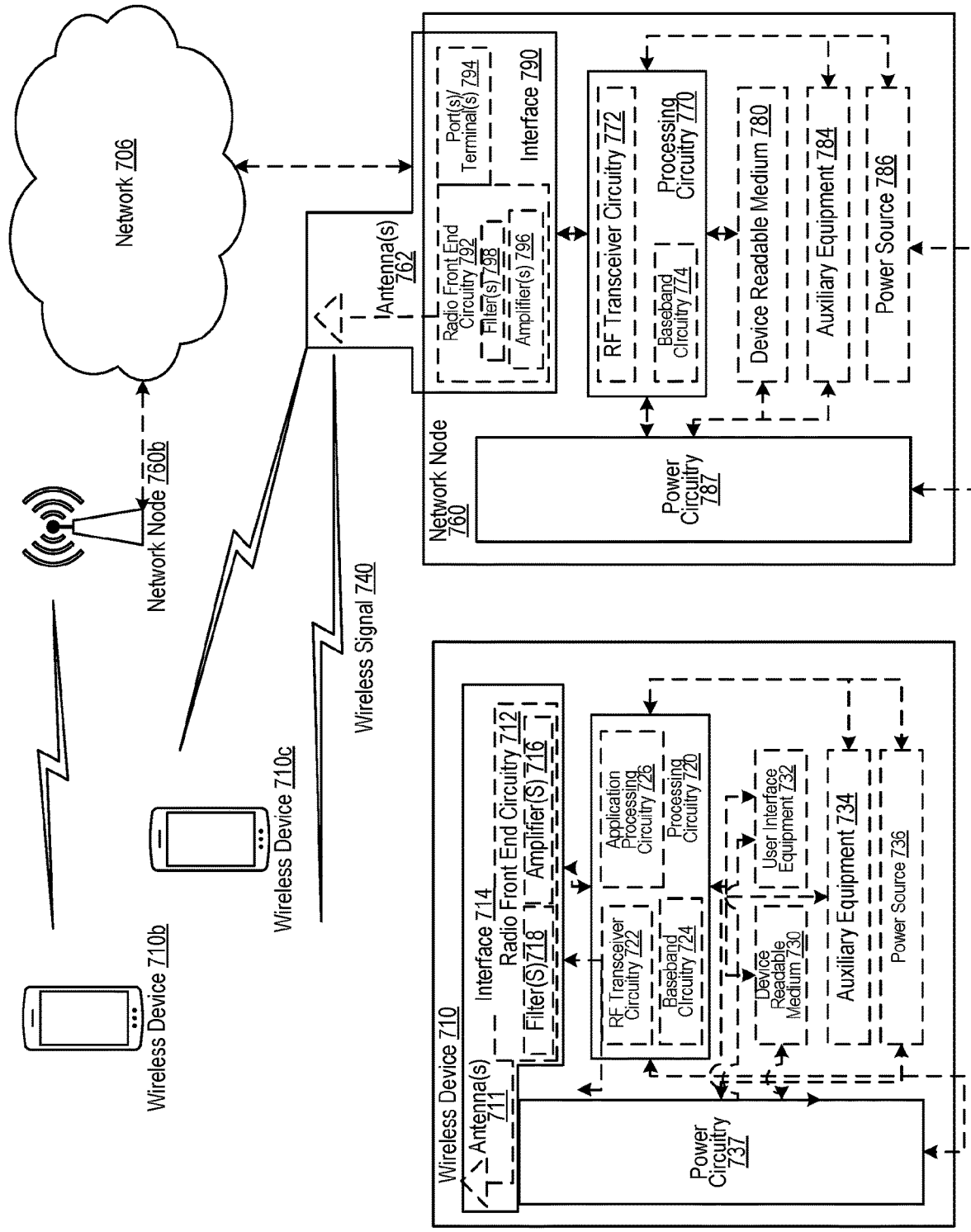
FIG. 7 shows a wireless network in accordance with some embodiments.

FIG. 7: A Wireless Network in Accordance with Some Embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760b, and WDs 710, 710b, and 710c. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and new radio (NR) NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay.

A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., mobile switching centers (MSCs), mobility management entities (MMEs)), operational and management (O & M) nodes, operation support system (OSS) nodes, self-optimized network (SON) nodes, positioning nodes (e.g., Evolved Serving Mobile Location Centers (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, wideband (code division multiple access (WCDMA), LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units.

In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data, or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated. The device readable medium may comprise the indoor radio transmitter count estimator 1000 in some embodiments.

Interface 790 is used in the wired or wireless communication of signaling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line-of-sight antenna used to transmit/receive radio signals in a relatively straight line. In some instances, the use of more than one antenna may be referred to as multiple-input and multiple-out (MIMO). In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720, and it is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714.

Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices, and circuits, and output interfaces, devices, and circuits. User interface equipment 732 is configured to allow input of information into WD 710 and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Figure 8:
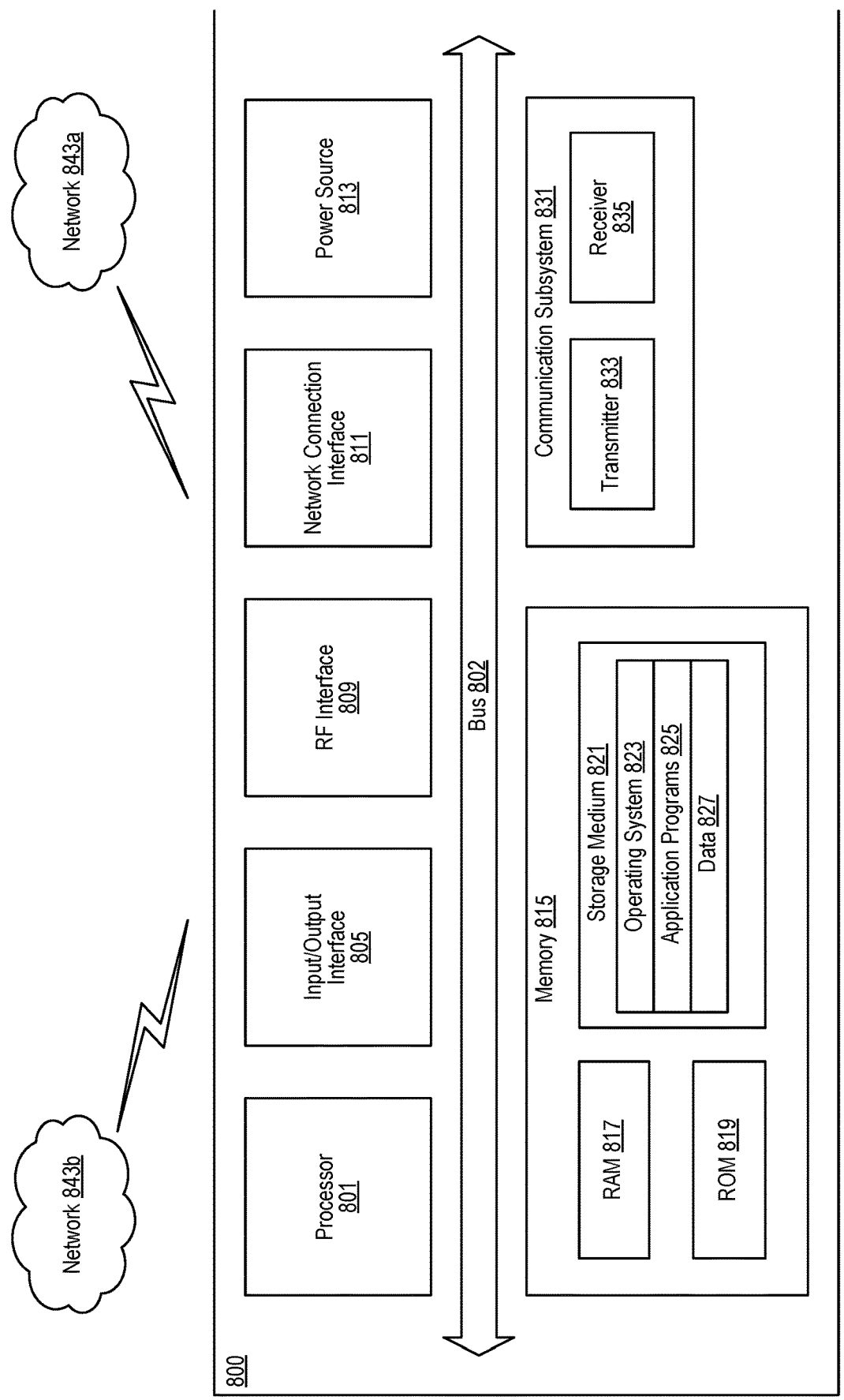
FIG. 8 shows a user equipment in accordance with some embodiments.

FIG. 8: User Equipment in Accordance with Some Embodiments

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 8200 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843*a*. Network 843*a* may encompass wired and/or wireless networks such as a local-area network (LAN), a wide-area network (WAN), a computer network, a wireless network, a telecommunications network, another like network or any combination thereof. For example, network 843*a* may comprise a Wi-Fi network. Network connection interface 811 may be configured to include a receiver and a transmitter interface used to communicate with one or more other devices over a communication network according to one or more communication protocols, such as Ethernet, transmission control protocol and Internet Protocol (TCP/IP), synchronous optical networking (SONET), Asynchronous Transfer Mode (ATM), or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUB/I) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843*b* using communication subsystem 831. Network 843*a* and network 843*b* may be the same network or networks or different network or networks. Communication subsystem 831 may be configured to include one or more transceivers used to communicate with network 843*b*. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, Universal Mobile Telecommunications System (UMTS) Terrestrial Radio Access Network (UTRAN), WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843*b* may encompass wired and/or wireless networks such as a local-area network (LAN), a wide-area network (WAN), a computer network, a wireless network, a telecommunications network, another like network or any combination thereof. For example, network 843*b* may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
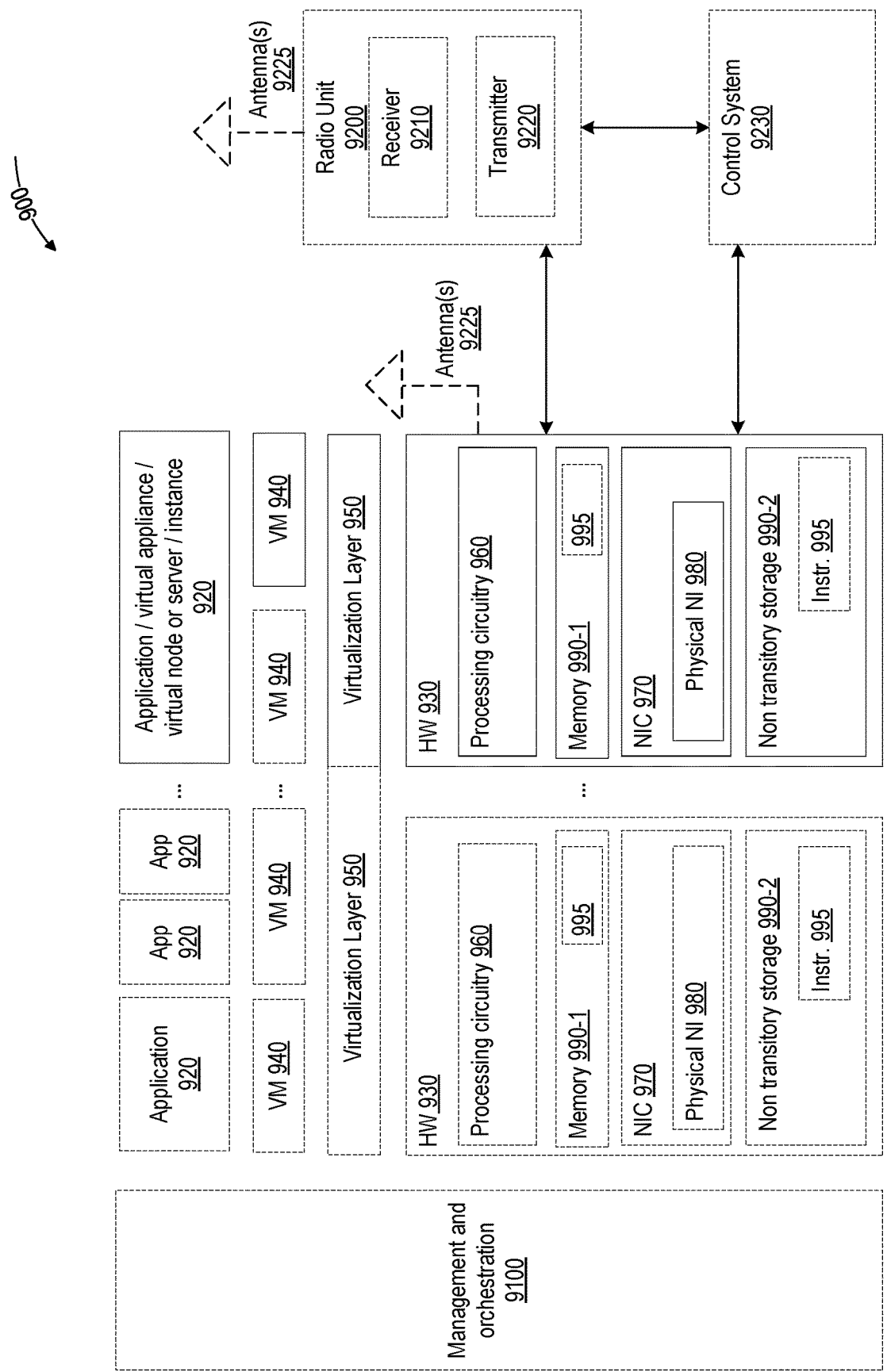
FIG. 9 shows a virtualization environment in accordance with some embodiments.

FIG. 9: Virtualization Environment in Accordance with Some Embodiments

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g., such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network element (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signaling can be affected with the use of control system 9230 which may alternatively be used for communication between the hardware nodes 930 and radio units 9200.

Figure 10:
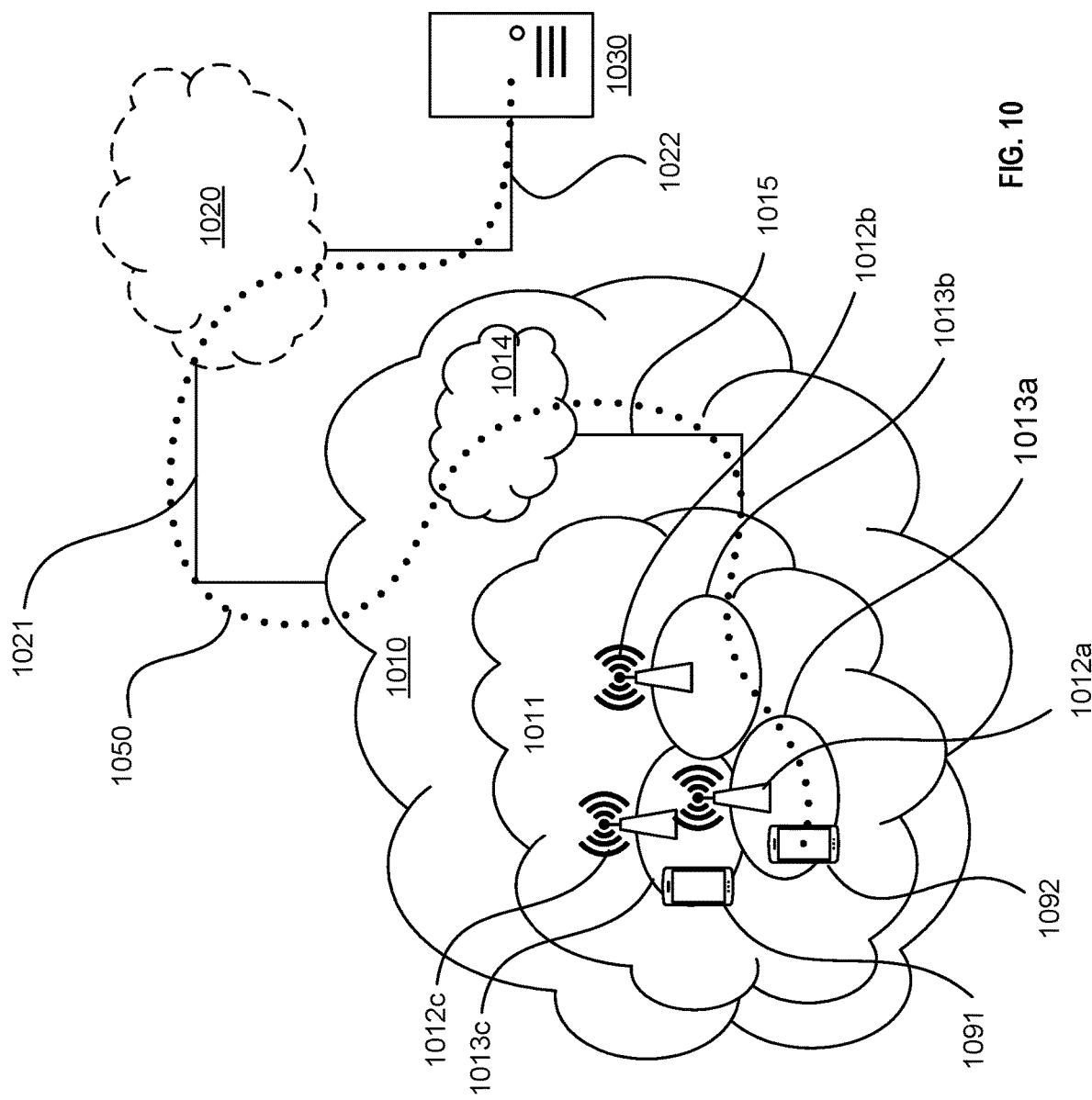
FIG. 10 shows a telecommunication network connected via an intermediate network to a host computer in accordance with some embodiments.

FIG. 10: Telecommunication Network Connected Via an Intermediate Network to a Host Computer in Accordance with Some Embodiments With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private, or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Figure 11:
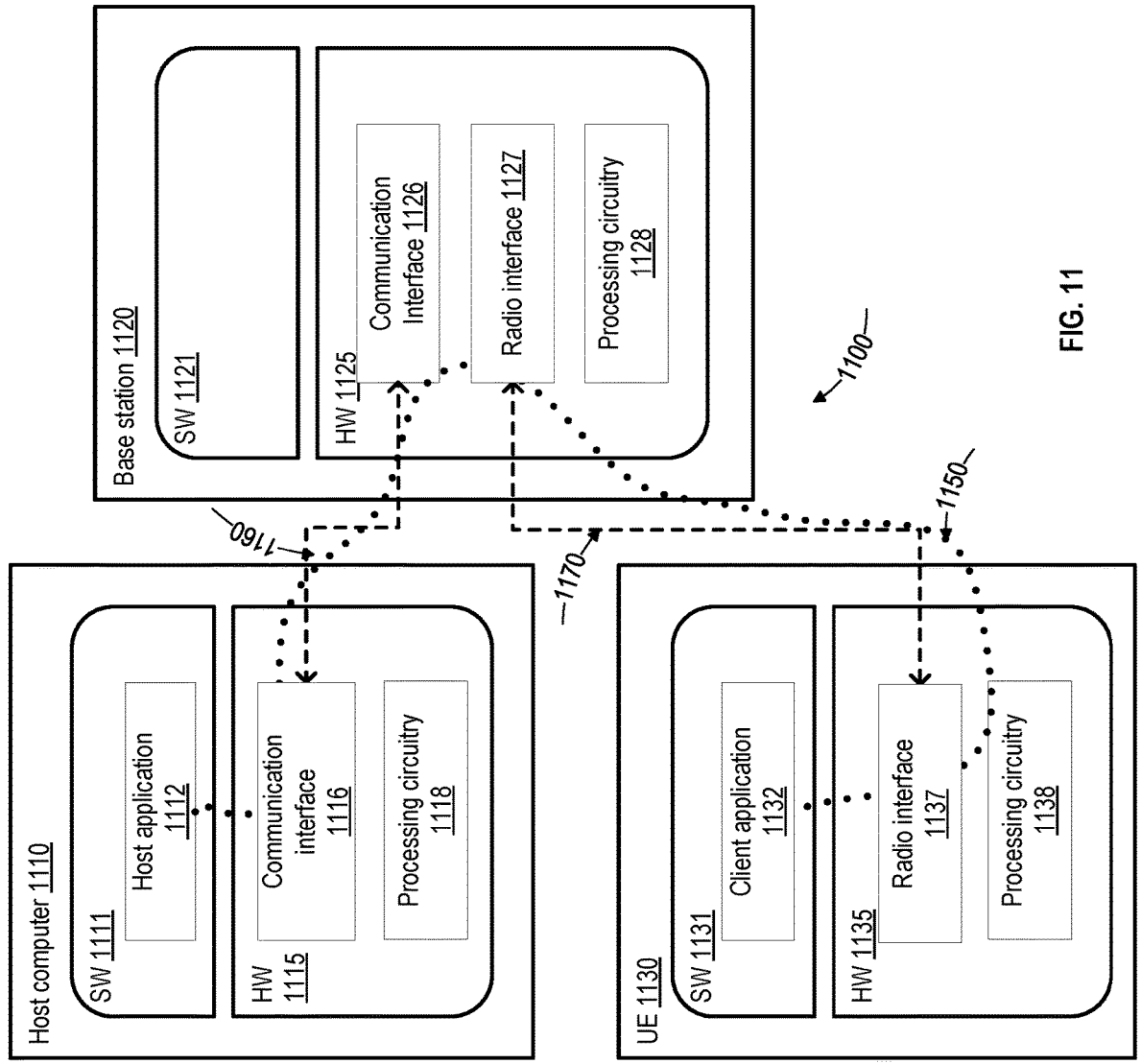
FIG. 11 shows a host computer communicating via a base station with a user equipment over a partially wireless connection in accordance with some embodiments.

FIG. 11: Host Computer Communicating Via a Base Station with a User Equipment Over a Partially Wireless Connection in Accordance with Some Embodiments Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment.

A measurement procedure may be provided for the purpose of monitoring data rate, latency, and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
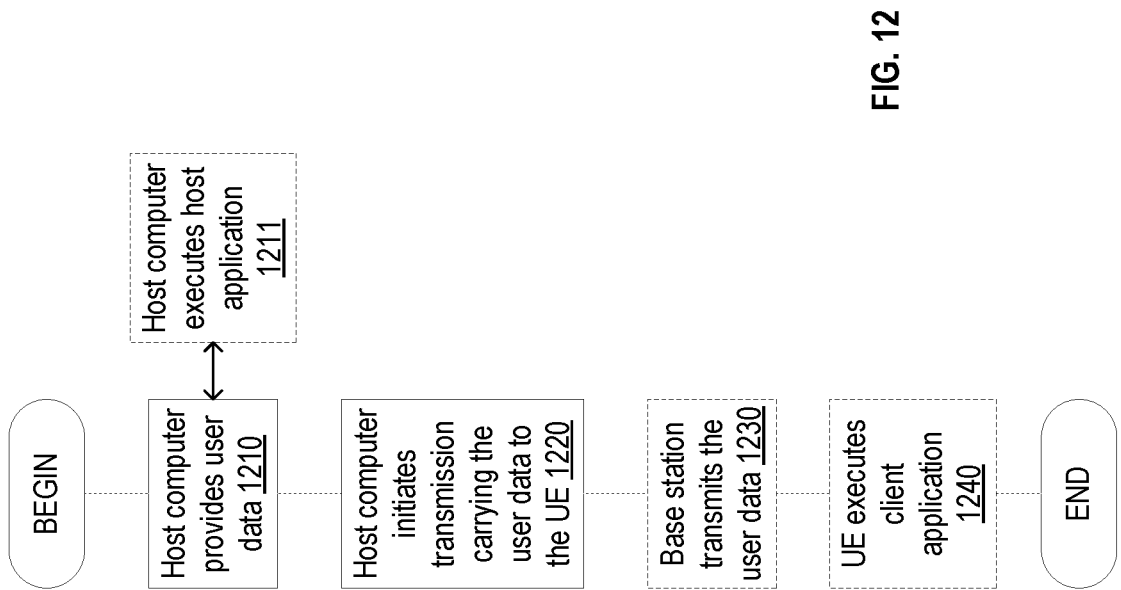
FIG. 12 shows a method implemented in a communication system including a host computer, a base station, and a user equipment in accordance with some embodiments.

FIG. 12: Methods Implemented in a Communication System Including a Host Computer, a Base Station and a User Equipment in Accordance with Some Embodiments FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
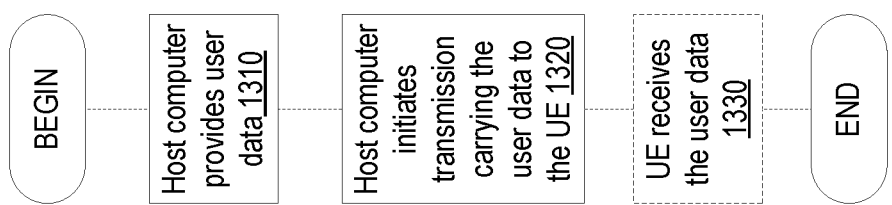
FIG. 13 shows a method implemented in a communication system including a host computer, a base station, and a user equipment in accordance with some embodiments.

FIG. 13: Methods Implemented in a Communication System Including a Host Computer, a Base Station and a User Equipment in Accordance with Some Embodiments FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
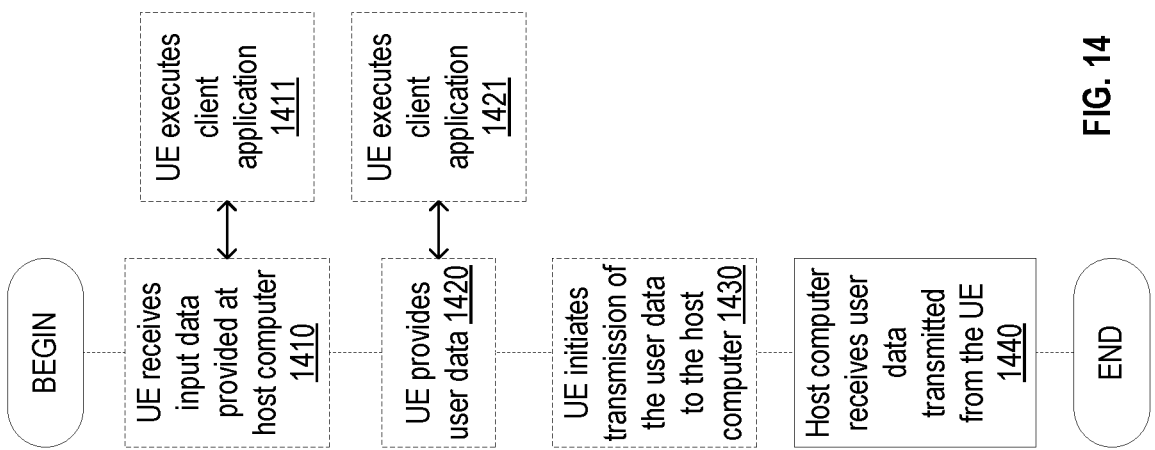
FIG. 14 shows a method implemented in a communication system including a host computer, a base station, and a user equipment in accordance with some embodiments.

FIG. 14: Methods Implemented in a Communication System Including a Host Computer, a Base Station and a User Equipment in Accordance with Some Embodiments FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
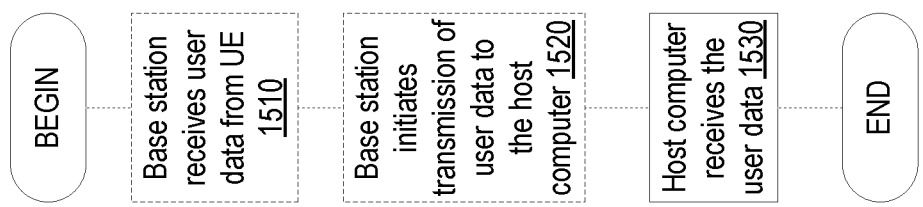
FIG. 15 shows a method implemented in a communication system including a host computer, a base station, and a user equipment in accordance with some embodiments.

FIG. 15: Methods Implemented in a Communication System Including a Host Computer, a Base Station and a User Equipment in Accordance with Some Embodiments FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments

1. A method of estimating an indoor radio transmitter count for a building, the method comprising:
locating (310) a building based on a query;
extracting (312) features from exterior information of the building; and
estimating (314) the indoor radio transmitter count for the building using the extracted features and a pre-trained model.
2. The method of embodiment 1, wherein the indoor radio transmitter count includes a number of radio transmitters to be implemented per floor for the building.
3. The method of embodiment 1, wherein the query indicates a geo-coordinate including latitude and longitude of the building.
4. The method of embodiment 3, wherein the query indicates a property name and/or street address, which is to be converted to the geo-coordinate in a digital map.
5. The method of embodiment 1, wherein the exterior information includes a footprint polygon of the building in a digital map.

6. The method of embodiment 1, wherein the exterior information includes an area size of a footprint polygon of the building in a digital map.
7. The method of embodiment 1, wherein the exterior information includes the number of neighbor buildings that is calculated from a list of footprint polygons of neighbor buildings within a pre-determined range from the building.
8. The method of embodiment 1, wherein the exterior information includes a population density of a town where the building locates.
9. The method of embodiment 1, wherein the exterior information includes a building coverage ratio of the building.
10. The method of embodiment 9, wherein the building coverage ratio is calculated by dividing the area size of the building footprint by the net property area that the building is included.
11. The method of embodiment 1, wherein the exterior information further includes a list of rental prices of nearby buildings within a predetermined range from the building.
12. The method of embodiment 1, wherein the exterior information includes average or median of rental prices of nearby buildings of the building.
13. The method of embodiment 1, wherein the exterior information further includes metadata showing the supply-demand relationship in the area where the building locates.

Group B Embodiments

14. A network device, comprising:
   a processor and non-transitory machine-readable storage medium storing instructions, which when executed by the processor, are capable of causing the electronic device to perform any of the steps of any of the Group A embodiments.
15. A non-transitory machine-readable storage medium storing instructions, which when executed by the processor, are capable of causing the electronic device to perform any of the steps of any of the Group A embodiments.

What is claimed is:

1. A method to estimate a count of indoor radio transmitters for a building, wherein the indoor radio transmitters are to be planned to build an indoor cellular network within the building, the method comprising:
   obtaining locational information of the building in a database based on a query;
   extracting features external to the building based on the locational information of the building, wherein the features external to the building capture characteristics about the building that are observable from outside of the building; and
   estimating the count of the indoor radio transmitters for the building using the extracted features and a pre-trained model that has been trained using historical building dataset and corresponding numbers of indoor radio transmitters.

2. The method of claim 1, wherein the count of the indoor radio transmitters includes a number of radio transmitters to be implemented per floor for the building.

3. The method of claim 1, wherein the query indicates a geo-coordinate including latitude and longitude of the building.

4. The method of claim 1, wherein the query indicates at least one of a property name and a street address, and wherein the at least one of the property name and street address is to be converted to a geo-coordinate in a digital map.

5. The method of claim 1, wherein the features external to the building include an area size of a footprint polygon of the building in a digital map.

6. The method of claim 1, wherein the features external to the building include metadata showing a building supply-demand relationship in an area in which the building is located.

7. The method of claim 6, wherein the metadata showing the building supply-demand relationship includes a number of neighbor buildings that is calculated from a list of footprint polygons of neighbor buildings within a pre-determined range from the building.

8. The method of claim 6, wherein the metadata showing the building supply-demand relationship includes a population density of a town or neighborhood in which the building is located.

9. The method of claim 6, wherein the metadata showing the building supply-demand relationship includes average or median of rental prices of buildings in a neighborhood of the building.

10. The method of claim 6, wherein the metadata showing the building supply-demand relationship includes a list of rental prices of nearby buildings within a predetermined range from the building.

11. The method of claim 1, wherein the features external to the building include information about floor density of the building.

12. The method of claim 11, wherein the information about floor density of the building includes a building coverage ratio of the building.

13. The method of claim 1, wherein the features external to the building includes a list of footprint polygons of neighbor buildings within a pre-determined range from the building.

14. The method of claim 13, wherein the list of footprint polygons is further used to calculate gaps between the building and its neighbor buildings.

15. The method of claim 13, wherein the list of footprint polygons is further used to calculate angles of blockage to the building by surrounding buildings.

16. The method of claim 1, wherein the pre-trained model uses one or more of a Random Forest Regressor model, an adaptive boosting (AdaBoost) model, and an extreme Gradient Boost (XGBoost) model.

17. An electronic device to estimate a count of indoor radio transmitters for a building, wherein the indoor radio transmitters are to be planned to build an indoor cellular network within the building, the electronic device comprising:
   a processor and non-transitory machine-readable storage medium storing instructions, which when executed by the processor, are capable of causing the electronic device to perform:
      obtaining locational information of the building in a database based on a query;
      extracting features external to the building based on the locational information of the building, wherein the features external to the building capture characteristics about the building that are observable from outside of the building; and
      estimating the count of the indoor radio transmitters for the building using the extracted features and a pre-trained model that has been trained using historical building dataset and corresponding numbers of indoor radio transmitters.

18. The electronic device of claim 17, wherein the features external to the building include metadata showing a building supply-demand relationship in an area in which the building is located.

19. A non-transitory machine-readable storage medium that stores instructions, which when executed by a processor, are capable of causing an electronic device to estimate a count of indoor radio transmitters for a building, wherein the indoor radio transmitters are to be planned to build an indoor cellular network within the building, the electronic device is to be caused to perform:
- obtaining locational information of the building in a database based on a query;
- extracting features external to the building based on the locational information of the building, wherein the features external to the building capture characteristics about the building that are observable from outside of the building; and
- estimating the count of the indoor radio transmitters for the building using the extracted features and a pre-trained model that has been trained using historical building dataset and corresponding numbers of indoor radio transmitters.

20. The non-transitory machine-readable storage medium of claim 19, wherein the pre-trained model uses one or more of a random forest regressor model, an adaptive boosting (AdaBoost) model, and an extreme Gradient Boost (XG-Boost) model.

* * * * *